June 22, 1943.   A. E. ANDERSON   2,322,557
SYSTEM OF ELECTRICAL DISTRIBUTION
Filed Oct. 14, 1942
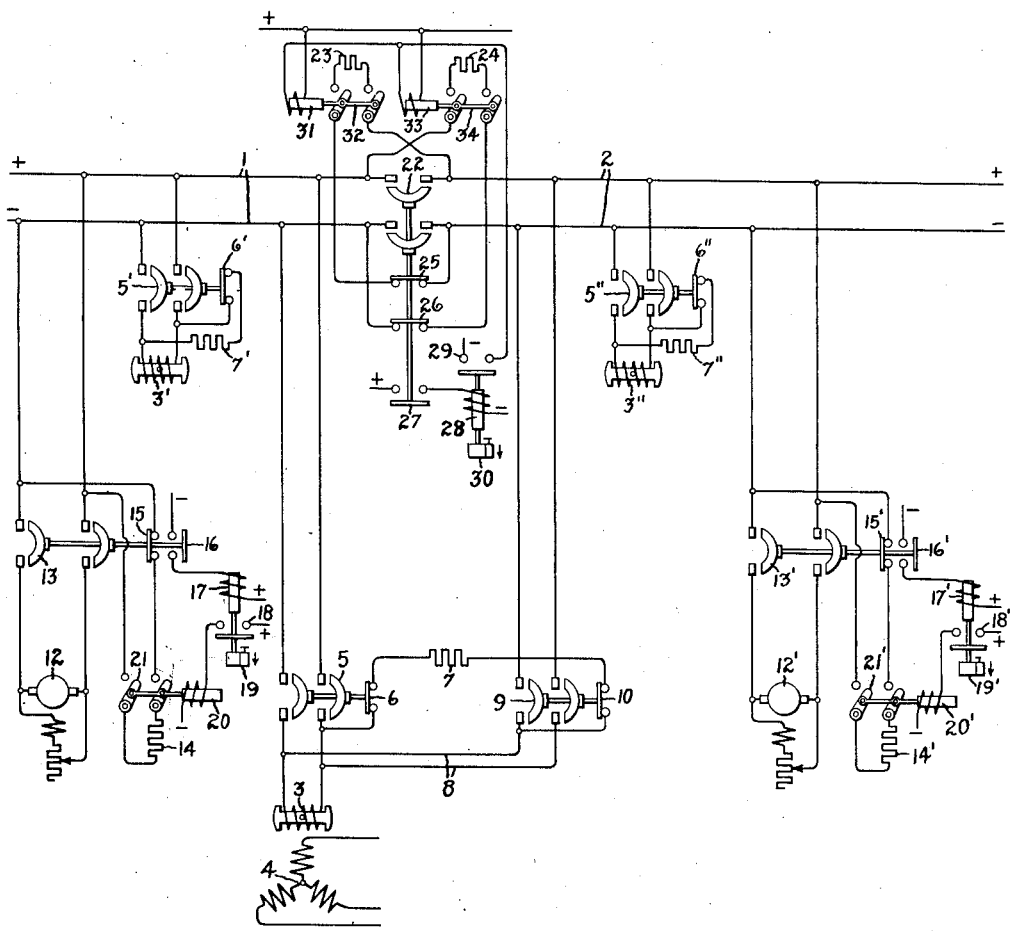
Inventor:
Arvid E. Anderson,
by Harry E. Dunham
His Attorney.

Patented June 22, 1943

2,322,557

UNITED STATES PATENT OFFICE 2,322,557

SYSTEM OF ELECTRICAL DISTRIBUTION

Arvid E. Anderson, Haverford Township, Delaware County, Pa., assignor to General Electric Company, a corporation of New York Application October 14, 1942, Serial No. 461,942

14 Claims. (Cl. 171—97)

My invention relates to systems of electrical distribution and more particularly to exciter busbar systems and systems of connections for the excitation circuits of alternating current generators and motors.

It is the usual commercial requirement that excitation equipment for dynamo-electric machines such as synchronous generators and motors be designed with a view to the maximum possible continuity of service. This usually involves reserve apparatus. In large exciter installations a double exciter bus or sectionalized exciter bus is found desirable in order to approach the goal of maximum possible continuity of service. It is, of course, well known that the connection between a field winding and its source of excitation should not be interrupted without at the same time closing the field winding through an energy absorbing circuit; otherwise a breakdown of the field insulation may occur. Heretofore, some protection has been provided by special field discharge switches which include a discharge resistor so arranged as to be connected continuously across the field circuit whenever the field switch is open. However, aside from the field discharge switches as heretofore used, the bus switches, the exciter switches, and other switches of the excitation system, have been limited to operating on reverse current or severe overloads, since discharge resistors in accordance with prior art practice cannot be used economically except with the field switch. The prior art practice, therefore, limits the required flexibility of control with regard to switching the various sources of supply in an excitation system, particularly in duplicate bus or sectionalized bus systems where, in order to assure continuity of service, considerable switching of the several sources and bus sections may be necessary for reasons other than fault conditions. Furthermore, accidental or unauthorized tripping may occur on such systems thereby requiring additional protection for the inductive devices of the system which is not afforded by the prior art systems.

It is, therefore, an object of my invention to provide a new and improved system of electrical distribution.

It is another object of my invention to provide a new and improved bus system for the excitation systems of dynamo-electric machines.

It is a further object of my invention to provide a new and improved sectionalized bus system for the excitation systems of alternating current dynamo-electric machines which is reliable and flexible and eliminates or reduces the possibility of voltage breakdown of the excited machine field winding during any desired switching sequence in the excitation system.

Although I have referred to my invention and will describe it presently as being particularly applicable for use in excitation systems for dynamo-electric machines, it will be obvious to those skilled in the art that it is generally applicable to electromagnetic energy storage means or inductive circuits which are capable of generating voltage transients upon release of the stored magnetic energy thereof when separate units of a plurality of sources of power are selectively switched to change the energization of such inductive circuits. In accordance with the illustrated embodiment of my invention, each circuit interrupting means of the excitation system, which may or may not include the field switch, is provided with circuit controlling means so that an energy absorbing circuit will be connected across the proper conductors of the excitation system momentarily or for a short time at least slightly greater than the duration of the field voltage transient occasioned by source switching so that no excited field winding during any desired switching procedure can ever be placed in open circuit without first dissipating its stored energy through an energy absorbing circuit. It is an important aspect of my invention that the connection of the energy absorbing circuit associated with any switch other than the field switch be momentary or of short duration, so as to reduce the continuous load on any connected source, keep the momentary overload well within the normal overload rating of such sources, reduce the rating of the energy absorbing circuit and generally reduce the losses of the system.

My invention will be better understood from the following description taken in connection with the accompanying drawing, and its scope will be pointed out in the appended claims.

In the single figure of the accompanying drawing, I have shown a diagrammatic illustration of an embodiment of my invention as applied to an excitation system for dynamo-electric machines.

Referring to the drawing, I have diagrammatically illustrated an embodiment of my invention in a sectionalized bus system comprising a plurality of bus sections shown for simplicity as two bus sections 1 and 2 which are arranged to energize the field winding 3 of a synchronous motor 4. The field winding 3 is connected to bus section 1 through a double-pole circuit interrupting means 5 which may be a switch of the field discharge type having an auxiliary switching device 6 which closes its contacts in the circuit of a field discharge resistor 7 arranged to be connected across the field winding 3 when the circuit interrupter 5 is operated to disconnect field winding 3 from bus section 1. Field winding 3 is also provided with an alternative excitation circuit 8 which is arranged to be connected to bus section 2 through a circuit interrupter 9, similar to circuit interrupter 5. Circuit interrupter 9 is provided with auxiliary switching device 10 with its contacts arranged in series with the contacts of switching device 6 of circuit interrupter 5 to close the circuit of the common field discharge resistor 7 across the field winding 3 when either circuit interrupter 5 or 9 is operated completely to disconnect field winding 3 from bus sections 1 and 2. Circuit 8 is not intended as a tie between the two bus sections so that one of the field switches 5 or 9 will be open either by mechanical or electrical interlocking when the other is closed. Hence, the circuit for the common discharge resistor 7 is completed only when one switch is open and a closed switch opens, or when both switches are in the open position. Thus discharge resistor 7 cannot be placed in a closed circuit to any source of power so as to become continuously energized.

Bus section 1 is arranged to be energized from a direct current generator or exciter 12 through a circuit interrupter 13. In accordance with my invention, I arrange to connect a discharge resistor 14 in a closed circuit across bus section 1 and hence across field winding 3 momentarily, and preferably for a period of time equal to the duration of the field voltage transient of field winding 3, whenever circuit interrupter 13 is operated to a circuit interrupting position. The discharge resistor 14 is connected momentarily so as to avoid sustained overloads and losses which would otherwise result if this resistor were continuously connected across the bus section 1 when it is energized from a second source of power to be described presently. A suitable means for effecting this momentary connection of field discharge resistor 14 may comprise a pair of auxiliary circuit interrupters or switches 15 and 16 arranged to be operated in accordance with the operating condition or position of switch 13. As illustrated, when switch 13 is in its circuit interrupting position switch 15 is arranged to be in a circuit closing position in one side of a circuit from the bus side of switch 13 to one side of discharge resistor 14. The other side of discharge resistor 14 is connected to the other side of the circuit on the bus side of switch 13. Conversely, when switch 13 is moved to its circuit closing position, switch 15 is moved to its circuit opening position and thereby prevents the discharge resistor circuit from being closed across bus section 1 so long as exciter 12 is connected to energize the bus. In order to effect the momentary connection of discharge resistor 14, the auxiliary switch 16 is arranged to be in a circuit opening position when switch 13 is in a like position and in a circuit closing position for a like position of switch 13. In its circuit closing position, switch 16 closes the circuit of a relay 17 having contacts 18. The relay 17 is provided with time delay opening means illustrated as a dashpot 19 with the direction of time delay indicated by the arrow. The energizing circuit of the operating coil of relay 17 may be any convenient source of control voltage and is indicated by the plus and minus signs. Contacts 18 of relay 17 control the energization of an operating mechanism 20 for a switching device 21 associated with the terminals of discharge resistor 14. The source of energization for the operating mechanism 20 may be the common source of control voltage and is similarly indicated by the plus and minus signs.

Bus section 2 is arranged to be energized by another exciter having a switch 2 and associated apparatus which is similar to exciter 12 and its associated apparatus and corresponding elements have been assigned like reference numerals which have been primed for easy identification.

It is usually desirable to be able to interconnect the bus sections so that the entire bus may be energized from all of the available sources or so that the entire bus may be energized from the source, or sources, associated with any one bus section. For purposes of affording the desired flexibility of selection for sources of energization for the excitation bus, I provide a bus-tie switch 22 between each pair of sections and as illustrated switch 22 interconnects bus sections 1 and 2. The bus-tie switches may thus connect the exciters in parallel, isolate a bus section or sections, or supply a plurality of sections from one or more exciters, within their respective ratings. In accordance with my invention, discharge resistors 23 and 24 are associated with each bus-tie switch 22 and are arranged, respectively, to be connected momentarily across bus sections 2 and 1 whenever switch 22 is operated to disconnect the associated bus sections. A satisfactory arrangement to effect this switching procedure is, as illustrated, to provide switch 22 with auxiliary switches 25, 26 and 27. Switch 25 is arranged to close its contacts in one side of a circuit from one side of discharge resistor 23 to the negative side of bus section 2 when switch 22 is in the open position. The other side of resistor 23 is connected to the positive side of bus section 2. Similarly, switch 26 is arranged to close its contacts in one side of the circuit from one side of discharge resistor 24 to the negative side of bus section 1 when switch 22 is in the open position. The other side of resistor 24 is connected to the positive side of bus section 1. In order to effect the momentary connection of discharge resistors 23 and 24, the switch 27 is arranged to be in a circuit opening position when switch 22 is in a like position, and in a circuit closing position when switch 22 is in a like position. In its circuit closing position, switch 27 closes the circuit of a relay 28 having contacts 29. The relay 28 is provided with time delay opening means illustrated as a dashpot 30 with the direction of time delay indicated by the arrow. The energizing circuit for relay 28 may be from the control source indicated by plus and minus signs. Contacts 29 of relay 28 control the energization of an operating relay 31 for operating a switch or contactor 32 associated with the terminals of discharge resistor 23. One side of the operating coil of relay 31 is connected to the positive side of the control circuit and the other side is connected to the negative side of the control circuit through the contacts 29 of relay 28. I also connect another operating relay 33 in parallel relation with relay 31 for operating a switch or contactor 34 associated with the terminals of discharge resistor 24. It will be obvious to those skilled in the art that since switches 32 and 34 are operated simultaneously a four pole switch and a single operating relay 31 may be utilized without departing from my invention in its broader aspects.

Other inductive windings or field excitation circuits may be connected to each bus section. Such a field winding 3' is indicated as being connected to bus section 1 through a circuit interrupter 5' provided with auxiliary switching means 6' for closing field winding 3' through a discharge resistor 7' when circuit interrupter 5' is operated to disconnect field winding 3' from bus section 1. Similarly, a field winding 3'' is connected to bus section 2 through a circuit interrupter 5'' provided with auxiliary switching means 6'' for closing field winding 3'' through a discharge resistor 7'' when circuit interrupter 5'' is operated to disconnect field winding 3'' from bus section 2.

Typical operating procedures of the illustrated embodiment of my invention are substantially as follows. It will be assumed that exciters 12 and 12' are each being operated by a suitable prime mover (not shown), and that switches 13 and 13' have been closed so that each bus section is energized by its own exciter at the normal voltage. It will also be assumed that switches 5 and 5' have been closed to connect field winding 3 and 3' for energization from bus section 1 and that switch 5'' has been closed to energize field winding 3'' from bus section 2. It will be further assumed that bus-tie switch 22 is open as well as switch 9 so that all excitation circuits connected to bus section 1 will be supplied from exciter 12 and, similarly, all excitation circuits connected to bus section 2 will be supplied from exciter 12'. Now assume that switch 13 is opened. In the absence of discharge resistor 14 a high voltage transient would appear across field winding 3 and any other excitation circuit connected to bus section 1. However, in accordance with my invention discharge resistor 14 is connected momentarily across bus section 1 to form a closed circuit for field winding 3 or any other field winding connected to bus section 1. The switching procedure is substantially as follows: While switch 13 is in its closed position, the control circuit for relay 17 is energized so that contacts 18 are closed which in turn causes the discharge resistor switch 21 to be closed. However, the circuit through the discharge resistor is not completed since contacts 15 are open. When switch 13 opens, it closes contacts 15 and thereby closes the circuit through discharge resistor 14. This circuit remains closed so long as contacts 18 of relay 17 remain closed to hold switch 21 in its circuit closing position. Since relay 17 is deenergized, as soon as switch 13 opens, contacts 18 remain closed only for a short interval of time determined by the time delay mechanism 19 which is adjusted with relation to the duration of the field transient of the excitation circuits connected to the exciter bus. A similar switching procedure would be accomplished with respect to exciter 12' and its switch 13' when considered with respect to bus section 2 alone.

In the operation of such an excitation system, it would also at times be desirable to energize both bus sections 1 and 2 from a single exciter 12 or 12'. Under these conditions, bus-tie switch 22 would be operated to its circuit closing position. It will be assumed both bus sections are energized from exciter 12 with exciter 12' disconnected from bus section 2. When the system is operating in this manner any excitation circuit connected to bus section 2 would ordinarily experience a current interruption and possibly a damaging voltage transient if bus-tie switch 22 were operated to isolate bus section 2. However, in accordance with my invention when switch 22 opens discharge resistor 23 is momentarily connected across bus section 2 by the closure of auxiliary switch 25 and similarly discharge resistor 24 is momentarily connected across bus section 1 by the closure of auxiliary switch 26. Discharge resistor 23 forms a closed circuit or energy absorbing circuit for any excitation circuit connected to bus section 2. It will also be noted, that while discharge resistor 24 is intended for connection across bus section 1, in the event bus section 1 were isolated without an immediate source of energization it happens that under the assumed conditions discharge resistor 24 is connected across bus 1 while energized from exciter 12. This, however, is a satisfactory operating condition since the degree of overload on exciter 12 is of a momentary nature and will not be very great since the discharge resistor will not draw more than 50% to 70% of the continuous excitation requirements, which will usually result in less than a permissible momentary overload of the order of 150% to 170%. The same conditions prevail with respect to discharge resistor 23 when bus section 2 is the energized bus section and bus section 1 is the isolated bus section.

Another operating condition involving the supplementary supply for field winding 3 through switch 9 from bus section 2 is as follows: Assume bus section 1 is deenergized and that switch 5 is in the open position and that switch 9 is closed with bus section 2 energized. If it is now desired to energize winding 3 from exciter 12 through bus section 1 without disconnecting exciter 12', exciter 12 is connected to bus section 1, switch 9 is opened, and with switch 5 in the open position this places discharge resistor 7 across field winding 3 through auxiliary switches 6 and 10. Immediately thereafter, switch 5 is closed interrupting the circuit of discharge resistor 7 and connecting field winding 3 to bus section 1.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an inductive winding, a plurality of separate sources of power for energizing said inductive winding, means for selectively connecting and disconnecting different units of said sources of power, an energy absorbing circuit, and means for momentarily connecting said energy absorbing circuit in a closed circuit with said inductive winding during the interval one of said sources is being disconnected from said inductive winding and another of said sources of power is being connected to energize said inductive winding.

2. In combination, an electric circuit, an inductive device connected to said electric circuit, a source of power, switching means for interconnecting said source and said electric circuit, a second source of power, a second switching means for interconnecting said second source and said electric circuit upon disconnection of said first source, an energy absorbing circuit associated with each of said switching means, and means operative upon disconnection of a connected source of power for momentarily connecting across said electric circuit the energy absorbing circuit associated with the switching means effecting such disconnection.

3. In combination, an electric circuit, an inductive device connected to be energized from said circuit, a plurality of sources of power arranged for connection to said electric circuit, circuit interrupting means interposed between each source of power and said electric circuit, an energy absorbing means associated with each circuit interrupting means, and means associated with each of said circuit interrupting means for introducing the energy absorbing means associated therewith momentarily in a closed circuit with said inductive device upon operation of such circuit interrupting means to disconnect its associated power source from said electric circuit.

4. In combination, an electric circuit, an inductive circuit connected to be energized from said circuit, a plurality of sources of power arranged for selective connection to said electric circuit in a manner to maintain the excitation of said inductive circuit substantially continuous, circuit interrupting means interposed between each source of power and said electric circuit, a resistor associated with each circuit interrupting means, and auxiliary switching means associated with each circuit interrupting means for connecting the associated resistor of such interrupting means in a closed circuit with said inductive device for a time sufficient to suppress any voltage transient arising in said inductive circuit upon disconnection of a source from said electric circuit.

5. In combination, an excitation bus comprising a first and a second section, an excitation circuit of a dynamo-electric machine connected to said first section, a direct current exciter, means including a switching device for interconnecting said exciter and said first section, a resistor associated with said switching device, auxiliary switching means associated with said switching device for momentarily connecting said resistor in a closed circuit with said excitation circuit upon operation of said switching device to disconnect said exciter, bus tie switching means interconnecting said bus section, a second exciter connected to said second section, means including a second switching device for interconnecting said second exciter and said second section, a second resistor, and auxiliary switching means associated with said second switching device for momentarily connecting said second resistor in a closed circuit with said excitation circuit upon operation of said second switching device to disconnect said second exciter.

6. In combination, an electric circuit comprising a plurality of sections, switching means for interconnecting each pair of said sections, an inductive winding connected to one of the sections of a pair of said sections, a plurality of sources of power, means for selectively connecting different sources of power to different sections, an energy absorbing means for each of said switching means, and auxiliary switching means associated with each of said switching means for momentarily connecting the energy absorbing means associated therewith in a closed circuit with said inductive winding upon operation of said first mentioned switching means to disconnect its associated sections.

7. In combination, an excitation bus comprising two sections, switching means for interconnecting said sections, an inductive winding connected to one of said sections, a plurality of sources of power, means for selectively connecting different sources of power to said bus, an energy absorbing circuit, and auxiliary switching means associated with said switching means for momentarily connecting said energy absorbing circuit in a closed circuit with said two sections upon operation of said first mentioned switching means to disconnect said sections.

8. In combination, an excitation bus comprising two sections, a bus-tie switch for interconnecting said sections, an excitation winding of a dynamo-electric machine connected to one of said sections, a plurality of exciters, means for selectively connecting different exciters to different bus sections, a pair of resistors, and auxiliary switching means associated with said bus-tie switch for momentarily connecting respective resistors of said pair across a different bus section upon opening of said bus-tie switch.

9. In combination, an excitation bus comprising a first and a second section, an excitation circuit of a dynamo-electric machine connected to one of said bus sections, a direct current exciter, means including a switching device for connecting said exciter to said first section, a resistor associated with said switching device, auxiliary switching means associated with said switching device and operative upon an opening operation of said switching device for momentarily connecting said resistor across said first bus section, bus-tie switching means for interconnecting said bus sections, a first and a second resistor associated with said bus-tie switching means, auxiliary switching means associated with said bus-tie switching means and operative upon disconnection of said bus sections for connecting momentarily said first resistor across said second bus section and said second resistor across said first bus section, a second direct current exciter, second exciter switching means for interconnecting said second exciter and said second bus section, a resistor associated with said second exciter switching means, and auxiliary switching means associated with said second exciter switching means and operative upon an opening operation of said second exciter switching means for momentarily connecting its associated resistor across said second bus section.

10. In combination, an electric circuit, an inductive winding connected to said circuit, a source of power for energizing said circuit, switching means for connecting said source to said circuit, an energy absorbing circuit, auxiliary switching means operative in response to the opening of said switching means for connecting said energy absorbing circuit to said electric circuit, means for interrupting the circuit to said energy absorbing means, relay means for controlling the interrupting operation of said last mentioned means, time-delay means for delaying the operation of said relay means, and means operated by the opening operation of said switching means for initiating the operation of said relay means.

11. In combination, an electric circuit, an inductive winding connected to said circuit, a dynamo-electric machine, a switching device for connecting said dynamo-electric machine to said electric circuit, an auxiliary circuit connected across said electric circuit and including an energy absorbing device, switching means interposed in said auxiliary circuit for controlling the connection of said energy absorbing device in said auxiliary circuit, circuit controlling means in said auxiliary circuit, means operative in response to the opening of said switching device for operating said circuit controlling means to complete said auxiliary circuit, means including an operating winding for controlling the opening and closing of said switching means, a relay comprising a control winding circuit for controlling the energization of said operating winding, means for delaying the opening of said relay, and means operative in accordance with the opening or closing of said switching device for opening or closing said control winding circuit.

12. In combination, an excitation bus comprising a first section and a second section, separate exciters for energizing each bus section, an excitation winding of a dynamo-electric machine, switching means associated with each bus section for selectively connecting said excitation winding for energization from either bus section, a resistor, auxiliary switching means associated with each of said switching means, and means controlled by said auxiliary switching means for connecting said resistor in a closed circuit with said excitation winding during the interval when both of said switching means are operated to a circuit interrupting condition.

13. In combination, an electric circuit, a plurality of sources of power capable of continuously delivering electric energy to said circuit, electromagnetic energy storage means connected for energization from said electric circuit and capable of producing an electromotive force upon release of its stored magnetic energy, switching means arranged one with each of said sources of power and said energy storage means, a plurality of energy absorbing means arranged one with each of said switching means, and means associated with said switching means for connecting one of said energy absorbing means momentarily across said electric circuit upon operation of the switching means associated with any source of power to cause release of the stored magnetic energy of said energy storage means and for connecting another of said energy absorbing means across said energy storage means when its associated switching means is operated to effect release of said stored magnetic energy.

14. In combination, an excitation bus comprising a plurality of bus sections, a plurality of dynamo-electric machine excitation circuits, switching means for selectively connecting and disconnecting said excitation circuits to and from said bus, a plurality of discharge resistors arranged one with each excitation circuit, means associated with each of said switching means for connecting its associated discharge resistor in a closed circuit with its associated excitation circuit continuously when said excitation circuit is disconnected from said bus, exciter switching means arranged one with each exciter for selectively connecting and disconnecting said exciters to and from said bus, a discharge resistor for each exciter switching means, means associated with each of said exciter switching means for momentarily connecting its associated discharge resistor across said bus when said exciter switching means is operated to disconnect its associated exciter from said bus, bus-tie switching means interposed between said bus sections, discharge resistors associated with said bus-tie switching means, and means associated with said bus-tie switching means for momentarily connecting an associated discharge resistor across each of the disconnected bus sections.

ARVID E. ANDERSON.